(12) United States Patent
Westrick, Jr.

(10) Patent No.: US 9,583,923 B2
(45) Date of Patent: Feb. 28, 2017

(54) CLASS I AND CLASS II MODULAR WIRING SYSTEM

(71) Applicant: ABL IP HOLDING LLC, Conyers, GA (US)

(72) Inventor: Richard L. Westrick, Jr., Social Circle, GA (US)

(73) Assignee: ABL IP Holding LLC, Decatur, GA (US)

( * ) Notice: Subject to any disclaimer, the term of this patent is extended or adjusted under 35 U.S.C. 154(b) by 320 days.

(21) Appl. No.: 13/832,857

(22) Filed: Mar. 15, 2013

(65) Prior Publication Data

US 2014/0262423 A1 Sep. 18, 2014

(51) Int. Cl.
*H02G 3/04* (2006.01)

(52) U.S. Cl.
CPC ................. *H02G 3/0481* (2013.01)

(58) Field of Classification Search
USPC ....... 74/103; 315/56; 174/113 R, 103, 133 B
See application file for complete search history.

(56) References Cited

U.S. PATENT DOCUMENTS

| | | |
|---|---|---|
| 1,721,218 A | 7/1929 | Hood |
| 1,959,302 A | 5/1934 | Paige |
| 2,070,141 A | 2/1937 | Robinson et al. |
| 2,120,088 A | 6/1938 | Carlson |
| 2,180,731 A | 11/1939 | Dickinson |
| 2,286,826 A | 6/1942 | Morrison |
| 3,211,821 A * | 10/1965 | Wakefield ................ H01B 7/02 174/103 |
| 3,892,912 A * | 7/1975 | Hauck ................... B29C 47/128 174/113 R |
| 4,078,184 A | 3/1978 | Phelps et al. |
| 4,096,351 A | 6/1978 | Wargin et al. |
| 4,775,328 A * | 10/1988 | McCarthy ............ H01R 25/006 439/211 |
| 5,110,999 A * | 5/1992 | Barbera ................. H01B 11/12 174/107 |
| 5,448,669 A | 9/1995 | Dunn et al. |

(Continued)

OTHER PUBLICATIONS

Article 725, Class 1, Class 2, and Class 3 Remote-Control, Signaling, and Power-Limited Circuits, National Electronic Code Handbook, 2011 (9 Pages).

(Continued)

*Primary Examiner* — Timothy Thompson
*Assistant Examiner* — Krystal Robinson
(74) *Attorney, Agent, or Firm* — Kilpatrick Townsend & Stockton, LLP

(57) ABSTRACT

A modular wiring system carries different types or classes of wiring in a single cable. The modular wiring system includes two conduits, one inside the other. The outer conduit is a Class I conduit and the inner conduit is a Class II conduit. The Class II wiring is carried in the inner conduit and the Class I wiring is carried between the inner conduit and the outer conduit. The outer conduit may be any type of material that is approved for Class I. The inner conduit meets the same voltage rating as the outer conduit. The inner conduit may include a non-conductive outer surface and an inner metallic sheath. The inner metallic sheath is grounded and provides separation between the Class I and Class II conductors.

26 Claims, 3 Drawing Sheets

(56) References Cited

U.S. PATENT DOCUMENTS

| | | | |
|---|---|---|---|
| 6,114,632 A | 9/2000 | Planas, Sr. et al. | |
| 6,380,485 B1* | 4/2002 | Beaman | H01R 9/035 |
| | | | 174/88 R |
| 6,884,935 B2 | 4/2005 | Whidden | |
| 6,903,277 B2 | 6/2005 | Whidden | |
| 6,998,538 B1 | 2/2006 | Fetterolf, Sr. et al. | |
| 7,205,480 B2 | 4/2007 | Fetterolf, Sr. et al. | |
| 7,208,684 B2* | 4/2007 | Fetterolf, Sr. | H01B 7/225 |
| | | | 174/113 R |
| 8,088,997 B2 | 1/2012 | Picard et al. | |
| 8,089,001 B2* | 1/2012 | Wang | H01B 11/08 |
| | | | 174/110 R |
| 8,841,563 B2* | 9/2014 | O'Neil | H02G 15/117 |
| | | | 174/549 |
| 2003/0121694 A1 | 7/2003 | Grogl et al. | |
| 2003/0205402 A1* | 11/2003 | Koyasu | H01B 11/04 |
| | | | 174/113 C |
| 2003/0230982 A1* | 12/2003 | Pagano | H05B 39/08 |
| | | | 315/56 |
| 2007/0074891 A1* | 4/2007 | Burke | H01B 7/06 |
| | | | 174/113 R |
| 2010/0314155 A1 | 12/2010 | Wang et al. | |
| 2011/0278043 A1* | 11/2011 | Ueda | H01B 7/1895 |
| | | | 174/115 |
| 2012/0067614 A1 | 3/2012 | Camp, II et al. | |
| 2013/0048136 A1 | 2/2013 | Korovessi et al. | |

OTHER PUBLICATIONS

Office Action for Canadian Application No. CA 2,845,603, mailed Sep. 11, 2015, 5 pages.

Notice of Allowance for Canadian Patent Application No. CA 2,845,603, mailed Aug. 31, 2016, 1 page.

* cited by examiner

CLASS I AND CLASS II MODULAR WIRING SYSTEM

FIELD OF THE INVENTION

The invention is directed to wiring systems and more particularly to a wiring system that supports both Class I and Class II wiring in the same cable.

BACKGROUND

Standards, such as the National Electric Code (NEC), set forth requirements and ratings for electric circuits and wiring. These standards may be adopted by a municipality or other authority to ensure that safe electrical practices are followed. The NEC defines the requirements and ratings for Class I and Class II wiring, as well as separation requirements for the different wiring classes. Class I wiring may be used to supply line voltage and Class II wiring may be used for low voltage communication or control signals. Traditionally, when both Class I and Class II wiring are needed, separate conduits are used for each wiring class in order to provide the required separation. If the Class I and Class II wiring could be combined in a single conduit, then the combined conduit would be less expensive and would require less time to install than two separate conduits. The combined conduit would also result in a cleaner finished installation since there would be less conduit running through the building or other installation. Thus, there is a need for a modular wiring system that accommodates both Class I and Class II wiring.

SUMMARY

The present invention provides a modular wiring system that carries different types or classes of wiring in a single cable. In one aspect of the invention the modular wiring system supports both Class I and Class II wiring in a single cable. The cable includes two conduits, one inside the other. The Class II wiring is carried in an inner conduit and the inner conduit is inside the outer conduit. The Class I wiring is carried between the inner conduit and the outer conduit. Since both the Class I wiring and the Class II wiring are carried inside the outer conduit, and the inner conduit also complies with the Class 1 voltage and separation requirements, there is no need to run separate conduits for each class of wiring. The outer conduit may be any type of material that is approved for Class I, including, but not limited to, metal-clad or non-metallic. The outer conduit may be either rigid or flexible depending upon the needs of the specific installation. The inner conduit meets the same rating as the outer conduit, but may be made of different material. The inner conduit may include a non-conductive outer surface and an inner metallic sheath. The inner metallic sheath is grounded and provides separation between the Class I and Class II conductors and helps protect the Class II conductors from noise. While the foregoing describes the inner conduit as containing Class II conductors, in other implementations the inner conduit may contain Class 1 power or signaling conductors since the inner conduit meets the requirements for a Class 1 rating. In yet another implementation the inner conduit may contain Class I conductors and Class II conductors may be carried between the outer and inner conduits.

Other features, advantages, and objects of the present invention will be apparent to those skilled in the art with reference to the remaining text and drawings of this application.

DETAILED DESCRIPTION

The present invention is directed to a modular wiring system that allows a single cable to carry different types or classes of wiring. In one aspect of the invention the modular wiring system supports both Class I and Class II wiring in a single cable. The modular wiring system includes an outer conduit and an inner conduit. The Class I conductors are located between the outer conduit and the inner conduit. The Class II conductors are located inside the inner conduit. The inner conduit is rated for Class I and has a non-conductive outer surface. The inner conduit includes an inner metallic sheath inside the outer surface. The metallic inner sheath provides separation between the Class I and Class II conductors and helps with noise suppression.

Exemplary Modular Wiring System

Figure 1:
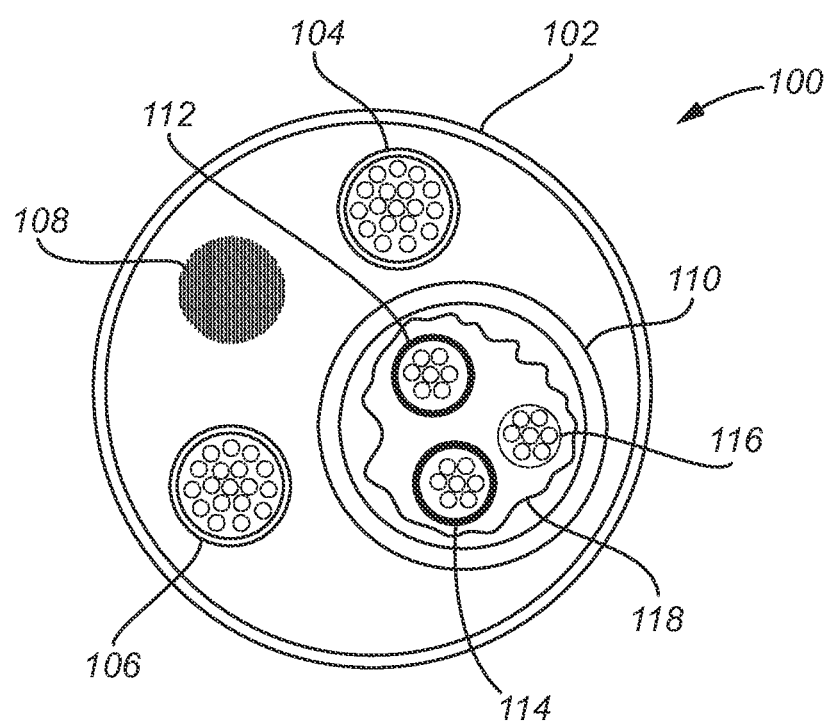
FIG. 1 is a cross section of an exemplary modular wiring system.
Figure 2:
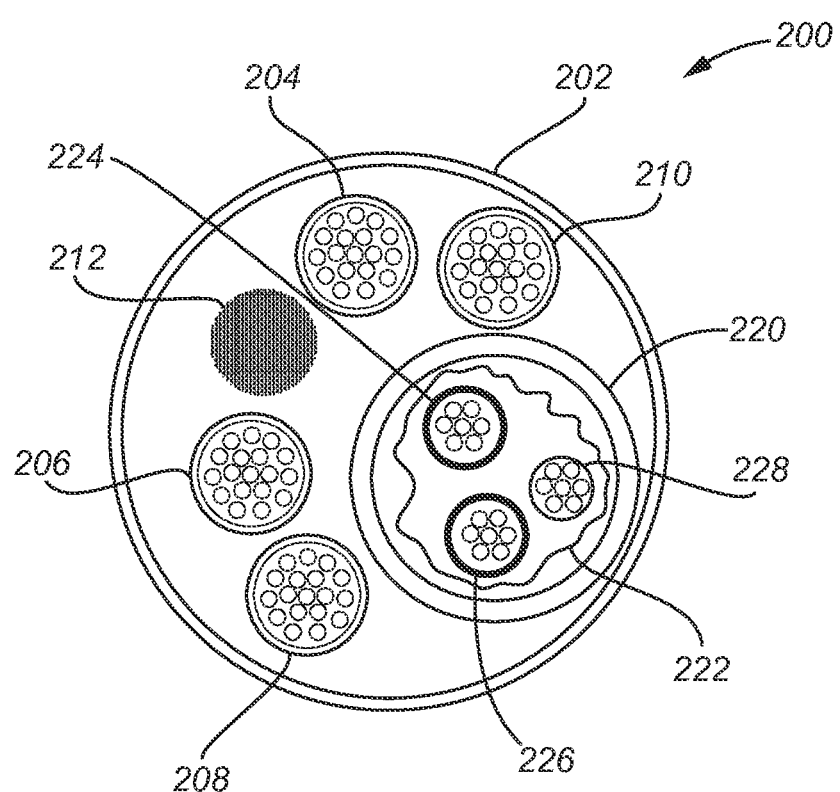
FIG. 2 is a cross section of another exemplary modular wiring system.

FIGS. 1 and 2 show two examples of modular wiring systems that include both Class I and Class II wiring in a single cable. FIG. 1 shows a modular wiring system 100 having an outer conduit 102 and an inner conduit 110. The outer conduit meets the Class I voltage rating, which is currently 600V. The outer conduit may be rigid or flexible and may be either metal-clad or non-metallic. In the example illustrated by FIG. 1, there are three conductors 104, 106, 108 between the outer conduit and the inner conduit. In one implementation, two of the conductors 104, 106 carry line voltage (i.e., hot and neutral) and the third conductor 108 is a grounding conductor, such as a solid bare ground wire. The inner conduit 110 includes an outer sheath 110 made out of non-conductive material, such as polyvinyl chloride (PVC) and a metallic inner sheath 118. The outer sheath of the inner conduit is rated for 600V to meet the Class I voltage requirements. FIG. 1 shows three conductors 112, 114, 116 inside the inner conduit. In one implementation, two of the conductors 112, 114 form a Class II twisted pair and the third conductor 116 is a drain wire. The drain wire may be grounded at one end of the cable. The metallic inner sheath 118 surrounds the drain wire 116 and the other conductors 112, 114 and is grounded at various points along the length of the cable when it contacts the drain wire.

FIG. 2 shows another modular wiring system 200 having an outer conduit 202 and an inner conduit 220. The outer conduit may be rigid or flexible and may be either metal-clad or non-metallic. In the example illustrated by FIG. 2, there are five Class I conductors 204, 206, 208, 210, 212 between the outer conduit and the inner conduit. In one implementation, four of the conductors 204, 206, 208, 210 are power or other high voltage conductors and the fifth conductor 212 is a grounding conductor. The inner conduit 220 includes an outer sheath made out of non-conductive material, such as polyvinyl chloride (PVC) that meets the Class I voltage requirements (e.g., 600V) and a metallic inner sheath 222. FIG. 2 shows three Class II conductors 224, 226, 228 inside the inner conduit 220. In one implementation, two of the conductors 224, 226 carry communication or control signals and the third conductor 228 is a drain wire. Similar to FIG. 1, the drain wire may be grounded at one end of the cable. The metallic inner sheath 122 surrounds the drain wire 228 and the other conductors 224, 226 and is grounded at various points along the length of the cable when it contacts the drain wire.

Although FIGS. 1 and 2 show a certain number of conductors between the outer conduit and the inner conduit and a certain number of conductors inside the inner conduit, other implementations may use different numbers of conductors in either location.

Typically, the conductors between the outer conduit and the inner conduit have a larger cross-section than the conductors within the inner conduit. In one implementation, the power or signal carrying conductors between the outer conduit and the inner conduit are 12 AWG conductors and the signal carrying conductors within the inner conduit are 18 AWG conductors. Other implementations may use other sizes of conductors, or contain the larger conductors within the inner conduit and the smaller conductors between the inner and outer conduits. For example, the Class I conductors may be within the inner conduit and the Class II conductors may be between the inner conduit and the outer conduit. Since the inner conduit meets Class I ratings, the conductors within the inner conduit may be Class I conductors. Other configurations are also possible, including configurations where the conductors within the inner conduit include a non-twisted pair, a fiber optic conductor, a Class I conductor, or other types of conductors.

Figure 3:
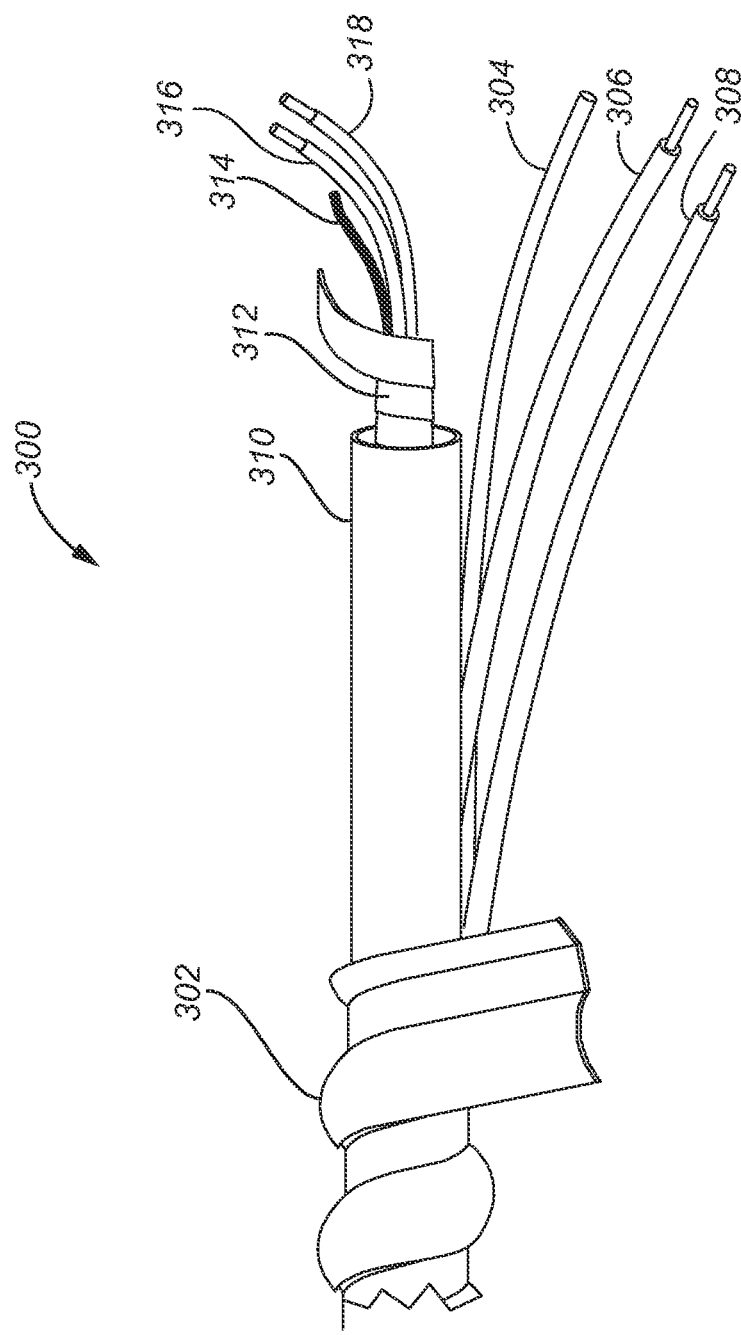
FIG. 3 is a lateral cut away view of an exemplary modular wiring system.

FIG. 3 presents another view of a modular wiring system 300. The modular wiring system includes an outer conduit 302 and an inner conduit 310. The outer conduit shown in FIG. 3 is a flexible metal-clad conduit. FIG. 3 shows three conductors 304, 306, 308 between the outer conduit 302 and the inner conduit 310. In one implementation, two of the conductors 306, 308 are power or other high voltage conductors and the third conductor 304 is a grounding conductor. The inner conduit 310 includes an outer sheath 310 made out of a non-conductive material and a metallic inner sheath 312. FIG. 3 shows three conductors 314, 316, 318 inside the inner conduit 310. In one implementation, two of the conductors 316, 318 carry communication or control signals and the third conductor 314 is a drain wire. Although FIG. 3 shows that the metallic inner sheath is wrapped around the conductors within the inner conduit, other types of metallic sheaths may be used in other implementations.

Since the metallic inner sheath is grounded at various points along the length of the cable when it contacts the drain wire, it provides a grounded metallic barrier between the Class I and Class II conductors. It also provides noise protection for the communication or control signals carried by the conductors within the inner conduit.

Exemplary Installation of a Modular Wiring System

In one implementation, the modular wiring system is used to connect light fixtures. The conductors between the outer conduit and the inner conduit provide power to the light fixtures and the conductors within the inner conduit provide communication or control signals to the light fixtures. A first cable may connect a dimmer to a first light fixture so that the Class I conductors carry power to the first light fixture and the Class II conductors carry communication or control signals. If the first cable includes the conductors illustrated in FIG. 3, then the grounding conductor between the outer conduit and the inner conduit is grounded at each end of the cable and the drain wire is grounded at one end of the cable. A second cable that is similar to the first cable may connect the first light fixture to a second light fixture so that the Class I conductors carry power to the second light fixture and the Class II conductors carry communication or control signals to the second light fixture. The grounding of the second cable is similar to the grounding of the first cable. Similar connections may be made with additional cables to connect the remaining light fixtures connected to the dimmer. The communication or control signals may carry 0-10V dimming control signals from the dimmer to the ballasts or drivers within each fixture.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. For example, although some of the examples describe cables with a certain number, type, and size of conductors or conductors used for certain functions, different numbers, types, and sizes of conductors and different functions are also included. Accordingly, the present invention is not limited to the embodiments described above or depicted in the drawings, and various embodiments and modifications can be made without departing from the scope of the invention.

What is claimed is:

1. A cable comprising:
   an outer conduit, wherein the outer conduit has a voltage rating of approximately 600 volts;
   an inner conduit located inside the outer conduit, wherein the inner conduit comprises a non-conductive outer sheath having a voltage rating of approximately 600 volts, and an inner metallic sheath;
   a plurality of conductors located between the inner conduit and the outer conduit, wherein:
      one of the plurality of conductors located between the inner conduit and the outer conduit is a grounding wire,
      at least two additional conductors of the plurality of conductors located between the inner conduit and the outer conduit are capable of carrying line voltage, and
      at least one of the additional conductors located between the inner conduit and the outer conduit has a diameter of approximately 12 American Wire Gauge (AWG); and
   a plurality of conductors located within the inner conduit, wherein:
      one of the plurality of conductors located within the inner conduit is a drain wire.

2. The cable of claim 1, wherein another one of the plurality of conductors located within the inner conduit is a low-voltage conductor capable of carrying 0-10V control signals.

3. The cable of claim 1, wherein another one of the plurality of conductors located within the inner conduit has a diameter of approximately 18 AWG.

4. The cable of claim 1, wherein the plurality of conductors located within the inner conduit includes a twisted pair.

5. The cable of claim 1, wherein the plurality of conductors located within the inner conduit includes a non-twisted pair.

6. The cable of claim 1, wherein the plurality of conductors located within the inner conduit includes at least one fiber optic conductor.

7. The cable of claim 1, wherein the drain wire is grounded at one end of the cable and the grounding wire is grounded at both ends of the cable.

8. The cable of claim 1, wherein the outer conduit is a flexible metal-clad conduit.

9. The cable of claim 1, wherein another one of the plurality of conductors located between the inner conduit and the outer conduit is a high-voltage conductor.

10. The cable of claim 1, wherein the non-conductive outer sheath comprises a polyvinyl chloride (PVC) material that has a voltage rating of approximately 600 volts.

11. The cable of claim 1, wherein a cross-sectional area of each of the plurality of conductors located between the inner conduit and the outer conduit is larger than a cross-sectional area of each of the plurality of conductors located within the inner conduit.

12. The cable of claim 1, wherein the inner conduit is flexible.

13. A cable comprising:
   an outer conduit, wherein the outer conduit has a voltage rating of approximately 600 volts;
   an inner conduit located inside the outer conduit;
   a plurality of conductors located between the inner conduit and the outer conduit, wherein at least two of the plurality of conductors are capable of carrying line voltage; and
   a plurality of conductors located within the inner conduit, wherein the plurality of conductors located within the inner conduit carry control signals,
   wherein at least one of the plurality of conductors capable of carrying line voltage located between the inner conduit and the outer conduit has a diameter of approximately 12 American Wire Gauge (AWG);
   wherein the inner conduit comprises a non-conductive outer sheath having a voltage rating of approximately 600 volts, and an inner metallic sheath, the outer and inner sheaths separating the plurality of conductors located within the inner conduit from the plurality of conductors located between the inner conduit and the outer conduit.

14. The cable of claim 13, wherein the plurality of conductors located within the inner conduit includes a twisted pair and a drain wire.

15. The cable of claim 13, wherein the plurality of conductors located within the inner conduit includes a non-twisted pair and a drain wire.

16. The cable of claim 13, wherein the plurality of conductors located within the inner conduit includes at least one fiber optic conductor.

17. The cable of claim 13, wherein the plurality of conductors located within the inner conduit includes a drain wire and wherein the inner metallic sheath of the inner conduit contacts the drain wire at a plurality of points along a length of the cable.

18. The cable of claim 17, wherein the drain wire is grounded at one end of the cable and the grounding wire is grounded at both ends of the cable.

19. The cable of claim 13, wherein the outer conduit is a flexible metal-clad conduit.

20. The cable of claim 13, wherein the outer sheath of the inner conduit comprises a polyvinyl chloride (PVC) material that has a voltage rating of approximately 600 volts.

21. The cable of claim 13, wherein the inner conduit is flexible.

22. The cable of claim 13, wherein the inner conduit is configured to carry the plurality of conductors, each conductor having a diameter of either approximately 12 AWG or approximately 18 AWG.

23. A method for connecting one end point with another endpoint using a modular wiring system, wherein the modular wiring system carries a plurality of conductors, each conductor having a diameter of between approximately 12 AWG and approximately 18 AWG, the method comprising:
   connecting a plurality of low voltage conductors to each endpoint, wherein the low voltage conductors are located within an inner conduit, wherein at least one of the plurality of low voltage conductors has a diameter of approximately 18 AWG, and wherein the inner conduit comprises a non-conductive outer sheath having a voltage rating of approximately 600 volts, and an inner metallic sheath;
   connecting a drain wire to each endpoint, wherein the drain wire is located within the inner conduit;
   connecting a plurality of line voltage conductors to each endpoint, wherein the line voltage conductors are located between an outer conduit having a voltage rating of approximately 600 volts and the inner conduit, and wherein at least one of the plurality of line voltage conductors has a diameter of approximately 12 AWG; and
   connecting a grounding wire to each endpoint, wherein the grounding wire is located between the outer conduit and the inner conduit.

24. The method of claim 23, wherein connecting a plurality of low voltage conductors to each endpoint comprises:
   connecting one end of the low voltage conductors to a dimmer and connecting another end of the low voltage conductors to a light fixture.

25. The method of claim 23, wherein connecting a plurality of line voltage conductors to each endpoint comprises:
   connecting one end of the line voltage conductors to a switch and connecting another end of the line voltage conductors to a light fixture.

26. The method of claim 23, wherein connecting a drain wire to each endpoint, further comprises grounding the drain wire at one of the endpoints.

* * * * *